United States Patent
Broker et al.

(10) Patent No.: US 10,156,858 B2
(45) Date of Patent: Dec. 18, 2018

(54) HVAC SYSTEMS, CONTROLS, AND METHODS INCLUDING SWITCH MODE POWER SUPPLIES TO ACHIEVE LOW STANDBY POWER

(71) Applicant: Emerson Electric Co., St. Louis, MO (US)

(72) Inventors: John F. Broker, Warrenton, MO (US); Richard M. Burkhart, St. Louis, MO (US); Shweta Annapurani Panimadai Ramaswamy, Pune (IN)

(73) Assignee: EMERSON ELECTRIC CO.

( * ) Notice: Subject to any disclaimer, the term of this patent is extended or adjusted under 35 U.S.C. 154(b) by 1068 days.

(21) Appl. No.: 13/792,319

(22) Filed: Mar. 11, 2013

(65) Prior Publication Data
US 2014/0005836 A1   Jan. 2, 2014

(30) Foreign Application Priority Data
Jul. 2, 2012   (IN) .......................... 1911/MUM/2012

(51) Int. Cl.
*H02M 1/00* (2006.01)
*F24F 11/30* (2018.01)
*G05D 23/19* (2006.01)

(52) U.S. Cl.
CPC .............. *G05D 23/19* (2013.01); *F24F 11/30* (2018.01); *H02M 2001/0032* (2013.01); *Y02B 70/16* (2013.01)

(58) Field of Classification Search
None
See application file for complete search history.

(56) References Cited

U.S. PATENT DOCUMENTS

| | | | |
|---|---|---|---|
| 6,154,374 A * | 11/2000 | Uejima | H02M 3/33561 363/16 |
| 6,179,213 B1 * | 1/2001 | Gibino | F24F 11/006 165/238 |
| 6,246,712 B1 | 6/2001 | Whyte et al. | |
| 6,496,390 B2 | 12/2002 | Yang | |
| 7,024,864 B2 * | 4/2006 | Alfrey | H02M 7/53871 330/146 |
| 7,840,142 B2 | 11/2010 | Keller | |
| 2005/0105304 A1 * | 5/2005 | Niemand | H02M 3/28 363/21.01 |
| 2009/0127486 A1 | 5/2009 | O'Reilly | |
| 2011/0225992 A1 * | 9/2011 | Lee | F24F 1/0003 62/80 |

(Continued)

FOREIGN PATENT DOCUMENTS

WO   2009/031168   3/2009

OTHER PUBLICATIONS

The Economist, "Pulling the plug on standby power"; Mar. 9, 2006; pp. 1-4.

*Primary Examiner* — Sean Shechtman
(74) *Attorney, Agent, or Firm* — Harness, Dickey & Pierce, P.L.C.; Anthony G. Fussner (57) ABSTRACT

Exemplary embodiments are disclosed of a heating, ventilation and air conditioning (HVAC) system that includes a switched mode power supply. The switched mode power supply is configured to provide standby power to the HVAC system. The standby power may be limited substantially in accordance with power demand by one or more components of the HVAC system.

20 Claims, 4 Drawing Sheets

(56) References Cited

U.S. PATENT DOCUMENTS

2011/0255319 A1* 10/2011 Ayukawa ............ H02M 1/4225
363/126
2015/0280490 A1* 10/2015 Simard ............... H02M 5/2573
307/66

* cited by examiner

HVAC SYSTEMS, CONTROLS, AND METHODS INCLUDING SWITCH MODE POWER SUPPLIES TO ACHIEVE LOW STANDBY POWER

CROSS-REFERENCE TO RELATED APPLICATION

This application claims the benefit and priority of India Application No. 1911/MUM/2012, filed Jul. 2, 2012. The entire disclosure of the above application is incorporated herein by reference.

FIELD

The present disclosure relates to heating, ventilation, and air conditioning (HVAC) systems, controls or controllers (e.g., indoor unit control for a furnace or air handler, etc.) and methods in which a switched mode power supply is used to achieve low standby power.

BACKGROUND

This section provides background information related to the present disclosure which is not necessarily prior art.

Today, it is common to provide a 24 VAC (volts alternating current) transformer between an HVAC system line voltage and various low-voltage control components of the HVAC system. For example, the low voltage may be used to signal a call for heat or cool from a thermostat or to engage a contactor to start an air conditioning compressor.

SUMMARY

This section provides a general summary of the disclosure, and is not a comprehensive disclosure of its full scope or all of its features.

Exemplary embodiments are disclosed of a heating, ventilation, and air conditioning (HVAC) system that includes a switched mode power supply. The switched mode power supply is configured to provide standby power to the HVAC system. The standby power may be limited substantially in accordance with power demand by one or more components of the HVAC system.

Exemplary embodiments also are disclosed of a control for a heating, ventilation, and air conditioning (HVAC) system. The control includes a switched mode power supply configured to provide standby and operating power to the HVAC system substantially in accordance with feedback indicating power consumption by one or more low-voltage components of the HVAC system.

Exemplary embodiments also are disclosed of a method of controlling one or more low-voltage components of a heating, ventilation, and air conditioning (HVAC) system. In an exemplary embodiment, the method is performed by a control of the HVAC system. The method includes changing a line voltage input of the HVAC system to a low voltage. The method also includes regulating the low voltage in accordance with feedback indicating power demand by one or more low-voltage components of the HVAC system. The method additionally includes using the regulated voltage to provide power to the low-voltage component(s). A switched mode power supply of the control performs at least the changing and regulating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

As noted above in the background section, many HVAC systems use a 24 VAC transformer to supply control voltage to components in the HVAC system. Additionally, many distributed HVAC systems use two 24 VAC transformers, one for powering low-voltage components of an indoor unit and another transformer for powering low-voltage components of an outdoor unit. Such a transformer may be sized to supply a maximum anticipated power, typically 40 VA (volt-amperes) for a standard residential 24 VAC supply, in which case the transformer is capable of supplying a maximum of 1.67 amps at 24 volts if required.

But as recognized by the inventors hereof, this load is rarely seen by the transformer, leading to losses in operation and significant losses in standby, especially when multiplied by the number of transformers on a typical utility grid. For example, existing transformers have inherent losses due to their construction and the low line frequency. A typical standby power is five watts.

The inventors have thus further recognized that if the transformers were replaced by a switched mode power supply, the operational and especially the standby losses would be significantly reduced, because the switched power supply could alter or tailor a current output (and thus power consumed) as a function of demand on the HVAC system. Accordingly, the inventors have disclosed exemplary embodiments of HVAC systems, controls or controllers (e.g., indoor unit control for a furnace or air handler, etc.) and methods in which a switched mode power supply is used to achieve low standby power. A switched mode power supply performs switching at high frequencies to vary current flow, and so can nearly eliminate or at least reduce the standby power, e.g., below one watt in exemplary embodiments.

As disclosed herein, a switched mode power supply may be used to provide a low voltage for HVAC low-voltage functions. This voltage can be provided in a HVAC system as AC and/or DC. This AC and/or DC voltage produced by a switched mode power supply can be used in both unconverted and converted forms. This can include a combination of AC and DC components in the same HVAC system, or a variety of DC voltages needed in the same HVAC system. In various aspects, an external power supply (e.g., an existing heavy 50/60 Hz transformer) that consumes power essentially constantly may be replaced with a switched mode power supply located, e.g., on an electronic control board of an indoor unit of an HVAC system. Aspects of the present disclosure also relate to upgrading the output of an existing 24 VAC transformer if a heat pump system is installed, for example.

To upgrade existing HVAC components, there are two situations, either the subsystem can operate on DC voltage, or the subsystem requires AC voltage. Currently, many parts inside a typical HVAC system require 24 VAC. These might include electronic control boards, reversing valves, contactors, safety switches, and more. For example, if an indoor unit is being replaced, and it has to work with an existing heat pump, and that heat pump requires 24 VAC for the reversing valve, then the indoor control will have to provide a form of 24 VAC for the indoor to be upgraded without making changes to the heat pump subsystem. Two ways to generate the 24 VAC output using a switcher that may work with most prior HVAC equipment would be to provide a square wave that goes from 0V to the DC output at approximately 60 Hz and 50% duty cycle, or to provide a square wave that goes from a negative DC voltage to a positive DC voltage at approximately 60 Hz and 50% duty cycle. This last approach can be done by centering the ground output on a single DC switcher output or by generating two DC outputs from the switcher supply. In either approach, if desired, filtering can be done to reduce the high frequency content from the square wave edges. Aspects of the present disclosure also relate to exemplary methods of powering and operation of HVAC system components.

As disclosed herein, exemplary embodiments of HVAC systems, controls or controllers (e.g., indoor unit control for a furnace or air handler, etc.) may include a switched mode power supply that is used, e.g., to achieve low standby power. Additionally or alternatively, in various embodiments a switched mode power supply that is used to achieve low standby power may be included in an outdoor unit control. In various aspects, an HVAC system includes a switched mode power source that can provide standby power to the HVAC system, where the standby power is limited substantially in accordance with power demand by one or more components of the HVAC system.

Figure 1:
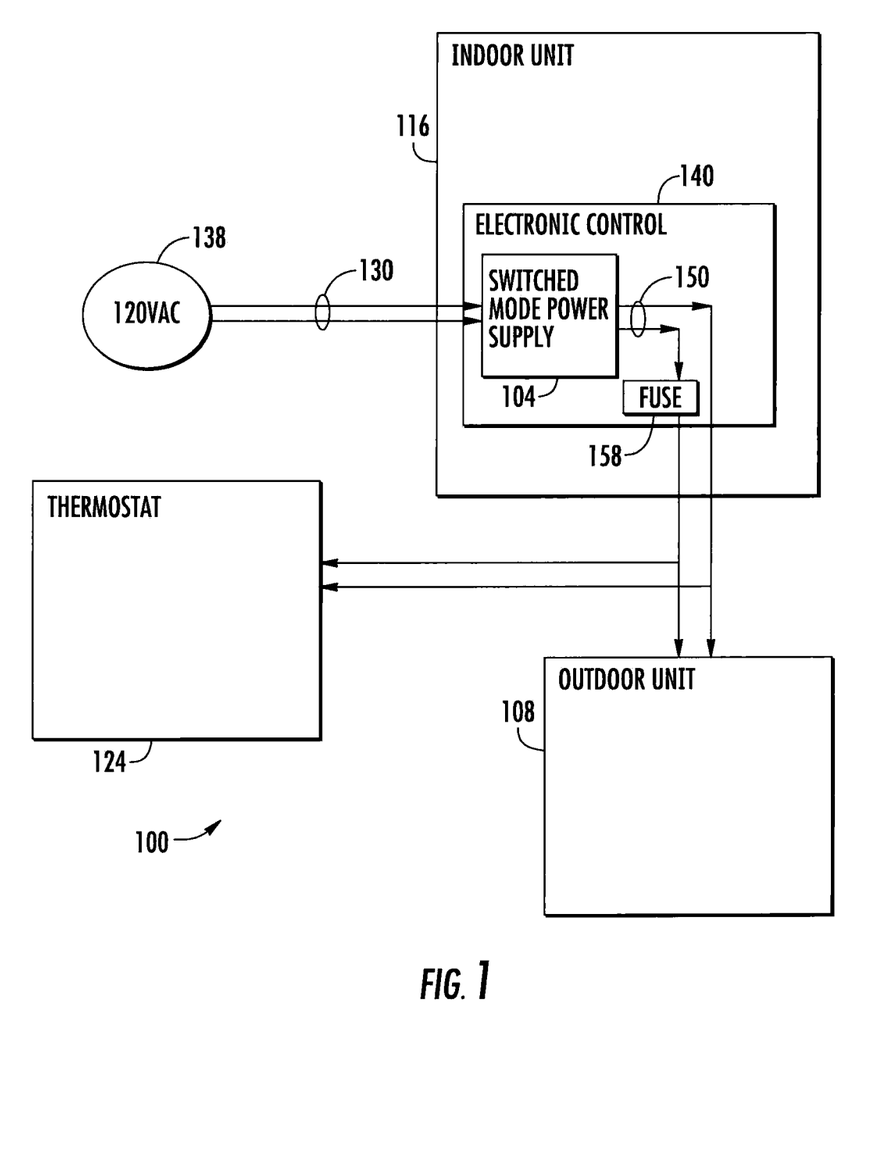
FIG. 1 is a diagram illustrating an exemplary embodiment of an HVAC system using direct current (DC) for low-voltage system operation and low-voltage standby power.

With reference now to the figures, FIG. 1 illustrates an exemplary embodiment of an HVAC system 100 embodying one or more aspects of the present disclosure. The HVAC system 100 includes components that are powered by line voltages. For example, an inducer and a circulator motor (not shown) may be powered by a 120 VAC line voltage, and a compressor (not shown) may be powered by a 240 VAC line voltage. In the present exemplary embodiment, however, the HVAC system 100 is configured such that substantially all low-voltage components of the HVAC system may operate on a DC voltage (e.g., 20 VDC) provided by a switched mode power supply 104. This DC voltage could be, but not limited to, 5 VDC, 12 VDC, 20 VDC, 24 VDC, 30 VDC, or more.

As shown, the HVAC system 100 is a distributed system. The HVAC system 100 has at least one outdoor unit 108, including, e.g., an air conditioning unit or a heat pump. The HVAC system 100 also has at least one indoor unit 116, including, e.g., a furnace or air handler. A thermostat 124 is in communication with the outdoor unit 108 and/or indoor unit 116, e.g., to control temperature. The HVAC system 100 receives voltage input 130 from a line voltage source 138 of, e.g., 120 VAC. The thermostat 124, indoor unit 116, and outdoor unit 108 may each include one or more low-voltage components. Generally, the terms "low-voltage", "low voltage" and the like may be used herein to refer to a voltage appropriate for the operation of HVAC system control components (e.g., typically about 24 volts AC or 20 volts DC, etc.)

Referring again to the example embodiment shown in FIG. 1, an electronic control 140 of the indoor unit 116 includes the switched mode power supply 104. The switched mode power supply 104 is configured to receive the voltage input 130 from the line voltage source 138 and to output a DC low voltage 150, e.g., 20 VDC, to low-voltage components of the thermostat 124, outdoor unit 108, to low-voltage component(s) of the indoor unit 116, and possibly to other or additional low-voltage components of the HVAC system 100. A fuse 158 is provided to prevent the DC output current from exceeding a predetermined limit, e.g., 5 amps. In the present embodiment, the switched mode power supply 104 is configured to provide both operational power and standby power to low-voltage components of the HVAC system 100.

Figure 2:
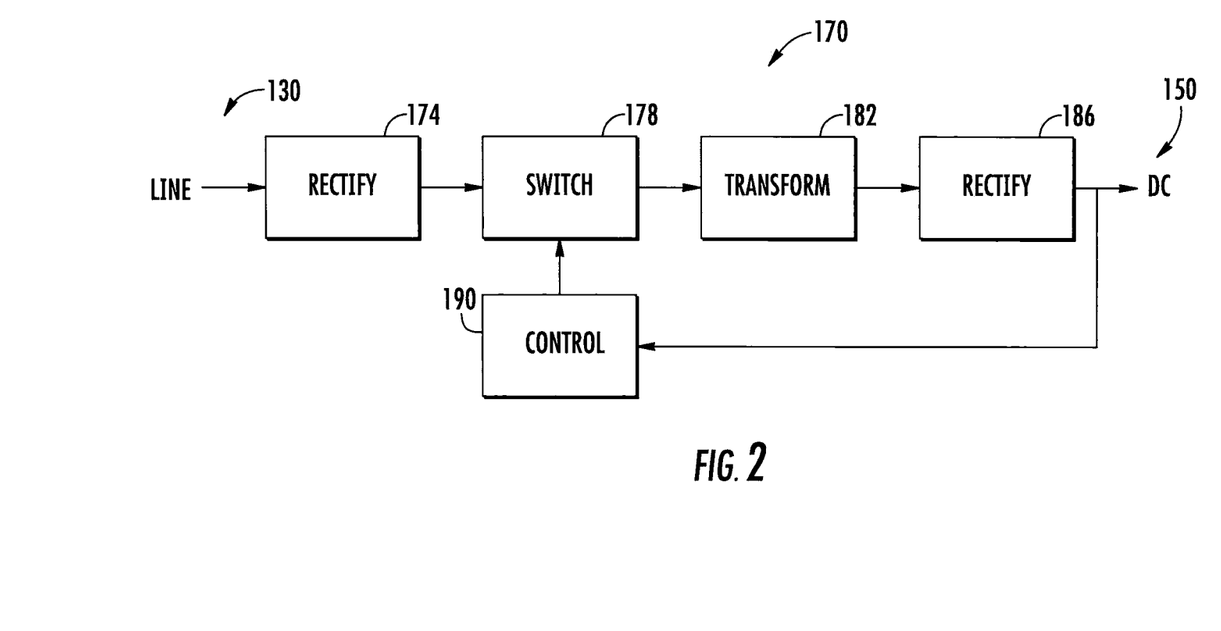
FIG. 2 is a simplified schematic diagram of an exemplary embodiment of a method for supplying switched mode power to an HVAC system.

In various embodiments, a switched mode power supply may be configured in various ways to provide power to low-voltage HVAC components. A simplified schematic of one example method for supplying switched mode power is shown in FIG. 2 and described with reference to the embodiment shown in FIG. 1. The line voltage input 130 may undergo rectification 174, high-frequency switching 178, and transformation 182 to obtain low-voltage AC. Rectification 186 may be performed to obtain DC low voltage 150. Appropriate filtering may also be performed in various implementations. The switching 178 is at frequencies typically much higher than the line voltage frequency, e.g., at 20 kilohertz or more, although switching at less than 20 kilohertz could be performed in some embodiments. Generally, the higher frequencies applied in switched mode power supplies can make it possible to use smaller transformers to reduce input voltage than the transformers typically used in HVAC systems. In some instances, one or more inductors could be used in place of or in addition to one or more transformers. Additionally or alternatively, current regulation could be used in some embodiments.

Switching 178 may be controlled, e.g., under pulse-width control 190 configured to regulate output voltage, e.g., to maintain the output voltage 150 at 20 VDC. Thus, power may be delivered to the HVAC system 100 substantially in accordance with feedback indicating power consumption by low-voltage component(s) of the HVAC system 100. When the output voltage 150 is regulated in this way, current is delivered to operating low-voltage components of the HVAC system 100 substantially only as drawn by the operating low-voltage components. In various aspects, when the HVAC system 100 is in a standby mode, the thermostat 124 may be the only component of the HVAC system that is in operation. Furthermore, in some embodiments the standby operation of the thermostat 124 may consist only of keeping a thermostat light illuminated. In such case, current (and therefore power) delivered to the low-voltage components may be very low, e.g., providing less than one watt of standby power. A preferred embodiment uses a DC voltage in all the HVAC components. There are many subsystem components in HVAC equipment that could be either more reliable or lower cost using DC instead of AC. For example, with a gas valve on a gas indoor furnace, the valve can be less expensive, since today, the valve needs to have a full wave bridge to convert AC to DC, and it has to have extra copper in the coil to handle the unregulated 24 VAC supply. Another example is the 24 VAC transformer itself, a switched mode power supply (SMPS) contained on a control board will cost less. Another example is on all of the electronic control boards, the 24 VAC must be converted to a DC supply. This AC to DC conversion is not needed if all the components are re-designed to work with DC only. And, with some loads, such as a contractor or reversing valve, a relay or triac must be used, but with DC, a simple transistor could be used, thus further reducing cost, both in the part and in the drive electronics.

Figure 3:
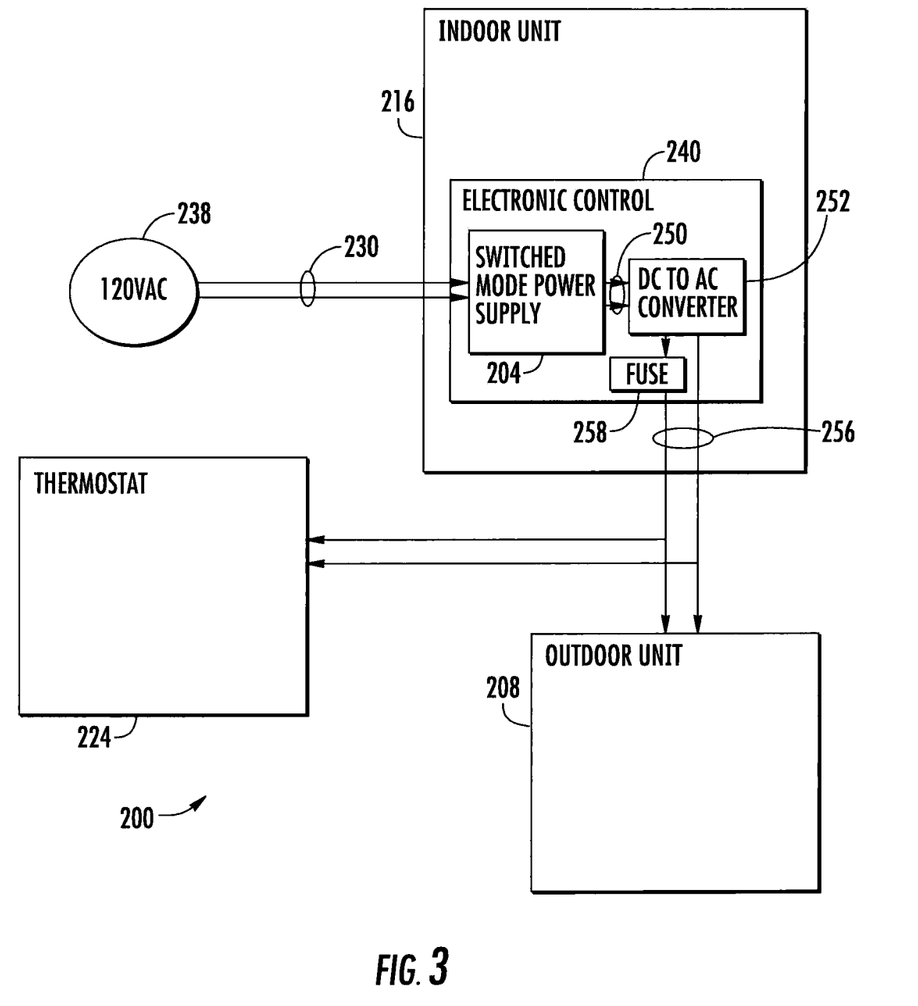
FIG. 3 is a diagram illustrating an exemplary embodiment of an HVAC system using alternating current (AC) for low-voltage system operation and low-voltage standby power.

FIG. 3 illustrates an exemplary embodiment of an HVAC system 200 embodying one or more aspects of the present disclosure. In the present exemplary embodiment, the HVAC system 200 is configured such that substantially all low-voltage components of the HVAC system may operate on an AC voltage (e.g., 24 VAC) provided by a switched mode power supply 204.

As shown, the HVAC system 200 includes at least one outdoor unit 208, e.g., an air conditioning unit or a heat pump. The HVAC system 200 also includes at least one indoor unit 216, e.g., a furnace or air handler. A thermostat 224 is in communication with the outdoor unit 208 and/or indoor unit 216, e.g., to control temperature in a house or other structure (not shown). The HVAC system 200 receives voltage input 230 from a line voltage source 238 of, e.g., 120 VAC. The thermostat 224, indoor unit 216, and outdoor unit 208 may each include one or more low-voltage components.

An electronic control 240 of the indoor unit 216 includes the switched mode power supply 204. The switched mode power supply 204 is configured to receive the voltage input 230 from the line voltage source 238 and to output a DC voltage 250. A DC-to-AC converter 252 converts the DC voltage 250 to an AC low voltage 256, e.g., 24 VAC, which is provided to low-voltage components of the thermostat 224, outdoor unit 208, to low-voltage component(s) of the indoor unit 216, and possibly to other or additional low-voltage components of the system 200. A fuse 258 is provided to prevent the AC low voltage 256 from exceeding a predetermined limit, e.g., 24 VAC.

The example embodiment shown in FIG. 3 is backward compatible in that it allows the use of standard components in the HVAC system 200 (e.g., gas valve, thermostat, outdoor unit, humidifier, etc.) that are designed to use 24 VAC power for control. The DC to AC converter 252 can output 24 VAC for legacy components and also provide for energy savings in standby by reducing the total power consumed by the system 200. In standby, the switched mode power supply 204 supplies only enough current to essentially power the thermostat 224, thus allowing for a drop or reduction in total power consumed in standby to less than one watt.

Figure 4:
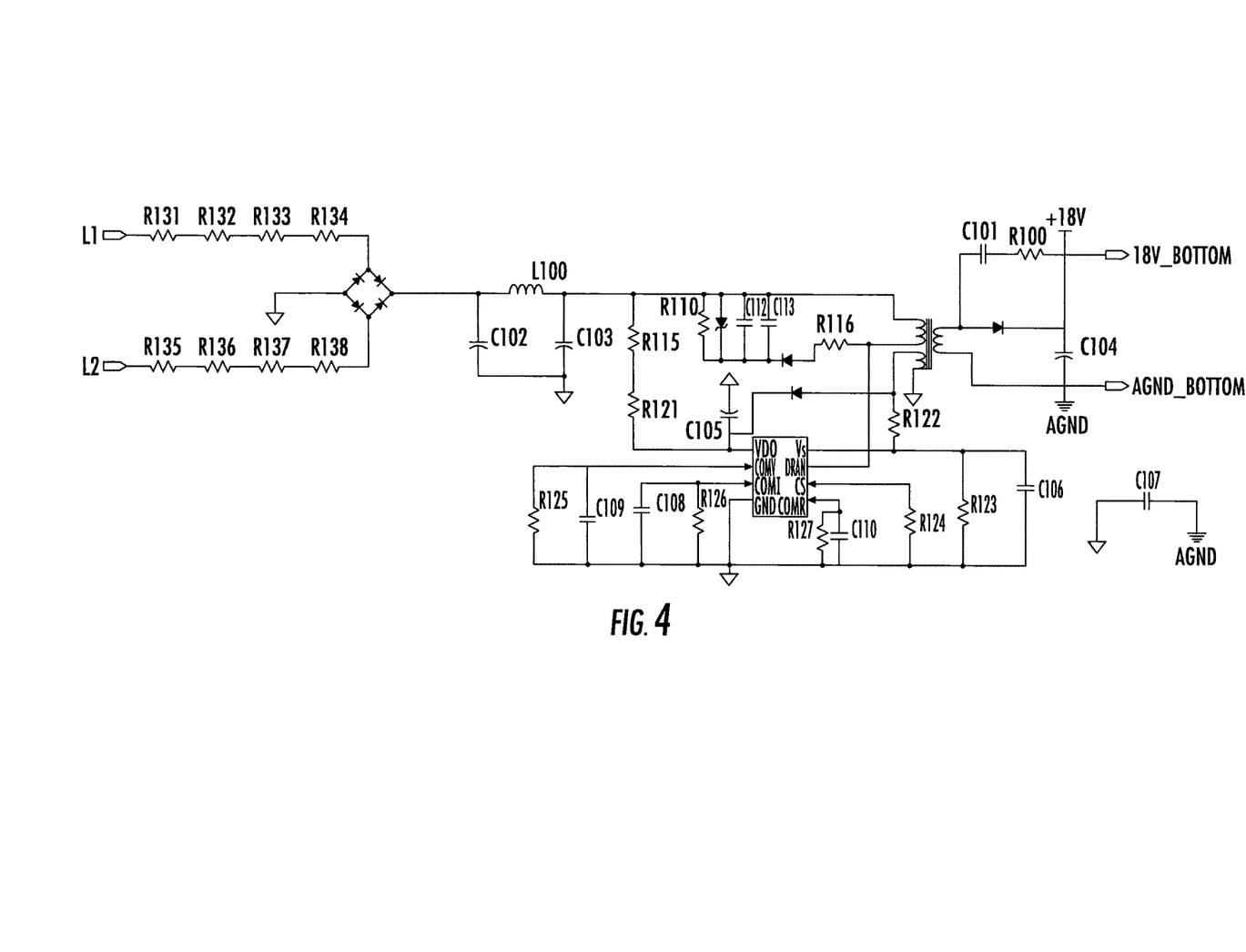
FIG. 4 is a schematic diagram of an exemplary embodiment of a system for supplying switched mode power to an HVAC system.

An exemplary embodiment of a system for supplying switched mode power to an HVAC system is shown in FIG. 4. Example component values are as follows.

R131, R132, R133, R134, R135, R136, R137, R138—430Ω
L100—1 mH/0.5 A
C101—0.001 µF
R100—12 Ω
C102, C103—10 µF/450 V
C104—120 µF
R115, R121—620 kΩ
R110—100 kΩ
C112, C113—33 nF
R116—0Ω
C105—22 µF
R122—47 kΩ
R125—43 kΩ
C107—1.5 nF
C109—0.01 µF
C108—0.047 µF
R126—200 kΩ
R127—82 kΩ
C110—0.1 µF
R124—1.2Ω
R123—10 kΩ
C106—47 pF

Embodiments of the foregoing systems, controls and methods make it possible to replace one, and in some cases two, transformers for a HVAC system, by providing a switched mode power supply, e.g., in one of the distributed units of the HVAC system to power low-voltage control components. Thus, for example, a switched mode power supply can power a control circuit for at least three distributed HVAC devices and/or units, e.g., a thermostat, an indoor unit, and an outdoor unit. In many HVAC systems currently in use, one 24 VAC transformer is provided for a heating circuit and a second 24 VAC transformer is provided for a cooling circuit. By using a switched mode power supply on an indoor unit control board, a need to install a second 24 VAC transformer, or to install a single larger transformer, to power new equipment can be avoided. In various embodiments, devices (such a gas valve) that are currently operable using 24 VAC may be provided instead as DC devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges. In addition, disclosure of ranges includes disclosure of all distinct values and further divided ranges within the entire range.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air conditioning (HVAC) system comprising a switched mode power supply for reducing a voltage received from a line voltage source;
    wherein the switch mode power supply is configured to provide low-voltage power from the line voltage source to the HVAC system by regulating voltage output by the switched mode power supply to a constant supply voltage that is constant and consistent for a plurality of operational modes of the HVAC system, while supplying current to one or more components of the HVAC system substantially only as drawn by the one or more components;
    wherein the low-voltage power is provided at low voltage of 24 volts or less to the one or more low-voltage components of the HVAC system by the switched mode power supply in accordance with a current operational mode of the HVAC system, where the HVAC system operational modes include a standby mode and at least a heating mode or a cooling mode.

2. The HVAC system of claim 1, wherein the switched mode power supply is configured to provide power to only a thermostat of the HVAC system in the standby mode.

3. The HVAC system of claim 1, wherein the switched mode power supply is configured to provide standby power as AC (alternating current) and/or as DC (direct current) to the HVAC system.

4. The HVAC system of claim 1, wherein the switched mode power supply is configured to regulate the voltage output to a constant supply voltage of twenty volts direct current (20 VDC) for operating the one or more low-voltage components of the HVAC system.

5. The HVAC system of claim 1, wherein the switched mode power supply is configured to provide operating power to the HVAC system.

6. The HVAC system of claim 1, wherein power provided to maintain at least one low-voltage component in the standby mode is less than one watt.

7. The HVAC system of claim 1, wherein:
    the HVAC system comprises a thermostat, an outdoor unit, and an indoor unit having an electronic control that includes the switched mode power supply;
    the switched mode power supply is configured to receive voltage input from the line voltage source and to output a DC voltage; and
    a DC-to-AC converter converts the DC voltage to an AC low voltage, which is provided to low-voltage components of the thermostat, outdoor unit, and/or indoor unit.

8. The HVAC system of claim 1, wherein:
the HVAC system comprises a thermostat, an outdoor unit, and an indoor unit having an electronic control that includes the switched mode power supply; and
the switched mode power supply is configured to receive voltage input from the line voltage source and to output a DC low voltage to low-voltage components of the thermostat, outdoor unit, and/or indoor unit.

9. A control for use in a heating, ventilation, and air conditioning (HVAC) system, the control comprising a switched mode power supply for reducing a voltage received from a line voltage source and configured to provide low-voltage standby power and low-voltage operating power to the HVAC system from the line voltage source by regulating voltage output of the switched mode power supply to a constant supply voltage that is constant and consistent for a plurality of operational modes of the HVAC system, while supplying current to one or more low-voltage components of the HVAC system substantially only as drawn by the one or more low-voltage components, where the HVAC system operational modes include a standby mode and one or more operating modes;
wherein the switched mode power supply is configured to provide the low-voltage standby power and the low-voltage operating power at low voltage of 24 volts or less in accordance with feedback indicating power consumption by the one or more low-voltage components of the HVAC system.

10. The control of claim 9, wherein the switched mode power supply is configured to provide standby power that does not exceed power delivered to a thermostat of the HVAC system.

11. The control of claim 9, wherein the switched mode power supply is configured to provide the standby power as AC (alternating current) and/or as DC (direct current) to the HVAC system.

12. The control of claim 9, configured to provide the low-voltage standby and operating power to the one or more low-voltage components in accordance with a current operational mode of the HVAC system, where the one or more HVAC system operating modes include at least a heating mode or a cooling mode.

13. The control of claim 9, configured to provide standby power of less than one watt.

14. The control of claim 9, provided on an HVAC system indoor unit.

15. A method of controlling one or more low-voltage components of a heating, ventilation, and air conditioning (HVAC) system, the method performed by a control of the HVAC system, the method comprising:
reducing a voltage from a line voltage input of the HVAC system to a low voltage;
regulating the low voltage to a constant low output voltage of 24 volts or less to be constant and consistent for a plurality of operational modes of the HVAC system, where the HVAC system operational modes include a standby mode and one or more operating modes; and
providing power from the constant low output voltage in accordance with feedback indicating power demand by one or more low-voltage components of the HVAC system, to supply current to the one or more low-voltage components substantially only as drawn by the one or more low-voltage components;
wherein at least the reducing and regulating and providing are performed by a switched mode power supply of the control during the standby and operating modes of the HVAC system.

16. The method of claim 15, performed to provide standby power only to a thermostat of the HVAC system.

17. The method of claim 15, wherein the low voltage is regulated to a constant supply voltage of twenty volts direct current (20 VDC).

18. The method of claim 15, further comprising:
converting the regulated voltage to an AC (alternating current) voltage; and
powering the one or more low-voltage components using the converted voltage.

19. The method of claim 15, wherein the regulated voltage is a DC voltage.

20. The method of claim 15, performed to provide standby power of less than one watt.

* * * * *